United States Patent
Ameen et al.

(10) Patent No.: US 7,618,529 B2
(45) Date of Patent: Nov. 17, 2009

(54) POLISHING PAD FOR ELECTROCHEMICAL MECHANICAL POLISHING

(75) Inventors: Joseph G. Ameen, Newark, DE (US); David B. James, Newark, DE (US)

(73) Assignee: Rohm and Haas Electronic Materials CMP Holdings, Inc, Newark, DE (US)

( * ) Notice: Subject to any disclaimer, the term of this patent is extended or adjusted under 35 U.S.C. 154(b) by 1101 days.

(21) Appl. No.: 10/854,321

(22) Filed: May 25, 2004

(65) Prior Publication Data

US 2005/0263406 A1 Dec. 1, 2005

(51) Int. Cl.
*B23H 5/08* (2006.01)
(52) U.S. Cl. .................................... 205/663
(58) Field of Classification Search ................ 205/662, 205/663
See application file for complete search history.

(56) References Cited

U.S. PATENT DOCUMENTS

| | | | |
|---|---|---|---|
| 3,284,274 A | 11/1966 | Hulslander et al. | |
| 3,504,457 A | 4/1970 | Jacobsen et al. | |
| 4,612,216 A * | 9/1986 | Kurfman | 427/250 |
| 4,841,680 A * | 6/1989 | Hoffstein et al. | 451/42 |
| 6,099,954 A | 8/2000 | Urbanavage et al. | |
| 6,419,556 B1 | 7/2002 | Urbanavage et al. | |
| 6,439,965 B1 | 8/2002 | Ichino et al. | |
| 6,998,166 B2 * | 2/2006 | Prasad | 428/141 |
| 2003/0209448 A1* | 11/2003 | Hu et al. | 205/640 |
| 2004/0040853 A1 | 3/2004 | Marsh et al. | |
| 2004/0082289 A1 | 4/2004 | Butterfield et al. | |

OTHER PUBLICATIONS

Kenneth Barbalace http://klbprouctions.com/. Periodic Table of Elements—Sorted by Electrical Conductivity. EnvironmentalChemistry.com. 1995-2008. Accessed on-line: Jan. 9, 2008 http://EnvironmentalChemistry.com/yogi/periodic/electrical.html.*

* cited by examiner

*Primary Examiner*—Roy King
*Assistant Examiner*—Jessee R. Roe
(74) *Attorney, Agent, or Firm*—Edwin Oh; Thomas S. Deibert

(57) ABSTRACT

The present invention provides polishing pad for electrochemical mechanical polishing. The pad comprises a cellular polymeric layer overlying a conductive substrate, the cellular polymeric layer having a thickness less than 1.5 mm.

10 Claims, 2 Drawing Sheets

POLISHING PAD FOR ELECTROCHEMICAL MECHANICAL POLISHING

BACKGROUND OF THE INVENTION

The invention generally relates to polishing pads for chemical mechanical polishing (CMP), in particular, the invention relates to polishing pads for electrochemical mechanical polishing (ECMP), including methods and systems therefor.

In the fabrication of integrated circuits and other electronic devices, multiple layers of conducting, semiconducting, and dielectric materials are deposited on or removed from the surface of a semiconductor wafer. Thin layers of conducting, semiconducting, and dielectric materials are deposited by a number of deposition techniques. Common deposition techniques include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes nonplanar. Because subsequent semiconductor processing (e.g., lithography) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

CMP is a common technique used to planarize substrates such as semiconductor wafers. In conventional CMP, a wafer carrier or polishing head is mounted on a carrier assembly and positioned in contact with a polishing pad (e.g., IC1000™ and OXP 4000™ by Rohm and Haas Electronic Materials CMP, Inc. of Newark, Del.) in a CMP apparatus. The carrier assembly provides a controllable pressure to the wafer, pressing it against the polishing pad. The pad is optionally moved (e.g., rotated) relative to the wafer by an external driving force (e.g., a motor). Simultaneously therewith, a polishing fluid (e.g., a slurry or reactive liquid) is flowed onto the polishing pad and into the gap between the wafer and the polishing pad. The wafer surface is thus polished and made planar by the chemical and mechanical action of the pad surface and polishing fluid.

Currently, there is a demand in integrated circuit (IC) manufacturing for increased densities of wiring interconnects necessitating finer conductor features and/or spacings. Further, there are increasing uses of IC fabrication techniques using multiple conductive layers and damascene processes with low dielectric constant insulators. Such insulators tend to be less mechanically robust than conventional dielectric materials. In manufacturing ICs using these techniques, planarizing the various layers is a critical step in the IC manufacturing process. Unfortunately, the mechanical aspect of CMP is reaching the limit of its ability to planarize such IC substrates because the layers cannot handle the mechanical stress and heat buildup during polishing. In particular, delamination and fracture of the underlayer cap and dielectric material occur during CMP due to frictional stress induced by the physical contact between the polished substrate and the polishing pad. In addition to the frictional stress, unwanted excess heat is produced by the physical contact, providing, for example, poor polishing results.

To mitigate detrimental mechanical effects associated with CMP such as those described above, one approach is to perform ECMP. ECMP is a controlled electrochemical dissolution process used to planarize a substrate with a metal layer. The planarization mechanism is a diffusion-controlled adsorption and dissolution of metals (e.g., copper) on the substrate surface by ionizing the metal using an applied voltage. In performing ECMP, an electrical potential must be established between the substrate and the polishing pad to effectuate electrodiffusion of metal atoms from the substrate metal layer. This can be done, for example, by providing an electrical current to the substrate carrier (anode) and the platen (cathode).

Jacobsen et al., in U.S. Pat. No. 3,504,457 discloses a stacked pad having a poromeric polishing layer 20 overlying an inert layer 35, for polishing semiconductor wafers. Unfortunately, inert layer 35 acts to insulate the adhesive 40 from the polishing layer 20 and the slurry. In other words, inert layer 35 has poor electrical conductivity and is ineffective for use in ECMP. In addition, inert layer 35 has poor thermal conductivity and will suffer from the excess heat buildup, as discussed above. Hence, what is needed is a polishing pad that overcomes the above noted deficiencies. Namely, what is needed is a polishing pad for ECMP that provides improved electrical and thermal capabilities and control.

STATEMENT OF THE INVENTION

In a first aspect, the present invention provides a polishing pad for electrochemical mechanical polishing, the pad comprising: a cellular polymeric layer overlying a conductive substrate, the cellular polymeric layer having a thickness less than 1.5 mm.

In a second aspect, the present invention provides a polishing pad for electrochemical mechanical polishing, the pad comprising: a cellular polymeric layer having a thickness less than 1.5 mm and overlying a conductive substrate, wherein the conductive substrate clads a flexible substrate.

In a third aspect, the present invention provides a polishing pad for electrochemical mechanical polishing, the pad comprising: a poromeric polishing layer overlying a circuitized flexible substrate, the poromeric polishing layer having a thickness less than 1.5 mm.

In a fourth aspect, the present invention provides a method of performing electrochemical mechanical polishing a workpiece, the method comprising: providing a polishing pad having a cellular polymeric layer overlying a conductive substrate, the cellular polymeric layer having a thickness less than 1.5 mm; providing an electrolytic polishing fluid between the workpiece and the cellular polymeric layer; providing a current to the workpiece; and pressing the workpiece against the cellular polymeric layer while moving at least the polishing pad or the workpiece.

DETAILED DESCRIPTION OF THE INVENTION

Figure 1:
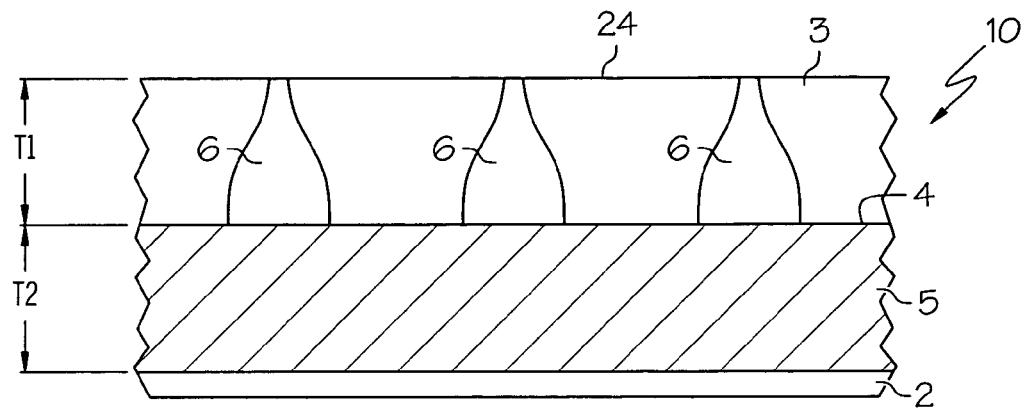
FIG. 1 illustrates an exemplary embodiment of the polishing pad of the present invention.

Referring now to the drawing, FIG. 1 illustrates a polishing pad 10 of the present invention comprising a cellular polymeric layer 3 overlying a top surface 4 of conductive substrate 5. As defined herein, a "cellular" polymeric layer is a polymeric layer containing cells or pores 6. The "cellular" polymeric layer is often referred to as "poromeric", or "poromeric polishing layer". In the present invention, conductive substrate 5 serves as an electrode (cathode) capable of electrically communicating with conductive matter (e.g., carrier substrate (anode)). The conductive substrate 5 of the present invention allows for good electrical and thermal conductivity to facilitate the ECMP process. Note, although the present invention is described in terms of a particular application of chemical mechanical polishing (e.g., electrochemical mechanical polishing), the present invention is equally useful for any type of chemical mechanical polishing where improved electrical and thermal conductivity is desired. An optional pressure sensitive adhesive 2 may be provided to adhere the polishing pad 10 to a platen of an ECMP apparatus, as discussed below.

Cellular polymeric layer 3 may be formed by providing a viscous solution of a polymer (e.g., an elastomeric polymer) in a suitable solvent (e.g., water/N,N-dimethylformamide (DMF)) onto the conductive substrate 5. The viscous solution of the polymer may be passed through, for example, water to coagulate the polymer in-situ onto the conductive substrate 5. Thereafter, the cellular polymeric layer 3 may be washed with water, and then dried to remove any residual solvent. Optionally, the outer skin of the cellular polymeric layer 3 may be buffed by conventional methods, to form a polishing surface 24 having an exposed, cellular structure. In addition, the polishing surface 24 may optionally be perforated, grooved or texturized as desired.

The cells 6 may have a diameter anywhere from a few microns to several hundred microns, for example, between 100 and 325 pores per mm$^2$. Typically, the number of pores per unit area, referred to as the "pore count," is used to describe the polishing surface. For purposes of this specification pore count refers to the average number of pores detectable per mm$^2$ at an optical magnification of 50X. A specific example of computer software useful for counting and processing pore data is Image-Pro Plus software, Version 4.1.0.1. The pore count is proportional to the (average) pore diameter, i.e., the higher the pore count, the smaller the average pore diameter. The walls of the cells 6 can be solid, but more typically the walls are made up of microporous sponge.

Because of the nature of the coagulation process, cells 6 tend to increase in diameter as they penetrate deeper into the material. Also, a thin skin-layer (not shown) forms on the upper surface of cellular polymeric layer 3. The diameters of the pores at or near the upper surface of layer 3 are relatively small compared to the underlying cell diameters and get larger as material is removed from the upper surface of layer 3 during buffing. Likewise, the pore count at or near the (original) surface is greater than when the pad is buffed down to create a new upper surface. For example, the pore count may be between 500 to 10,000 pores per mm$^2$ at or near the original surface.

Top surface 4 may optionally be treated to promote adhesion of cellular polymeric layer 3 to the top surface 4 of conductive substrate 5. For example, top surface 4 may be treated with an oxidizer (e.g., hydrogen peroxide), a coupling agent (e.g., melamine) or a primer coat.

Advantageously, cellular polymeric layer 3 has a thickness T1 to promote ECMP. Thickness T1 is selected to maximize removal during the ECMP process, while maintaining a sufficient thickness to provide optimized planarization. In other words, thickness T1 is optimized so that the conductive substrate 5 (cathode) and substrate carrier (anode) can provide maximum potential for facilitating removal of unwanted materials, while providing sufficient thickness for planarization. Thickness T1 is advantageously less than 1.5 mm (60 mils). Preferably, thickness T1 is less than 0.5 mm (20 mils). More preferably, thickness T1 is less than 0.25 mm (10 mils). In addition, conductive substrate 5 has a thickness T2 between 0.7 mm to 0.38 mm (3-15 mils). Preferably, thickness T2 is between 0.01 mm to 0.25 mm (5-10 mils).

The cellular polymeric layer 3 can be made of any polymeric, film-forming material of which a liquid solvent solution can be formed and a layer of the solution dried to form a normally solid polymeric film (i.e., solid at normal atmospheric temperatures). The polymeric material can consist of straight polymers or blends thereof, with additives such as curatives, coloring agents, plasticizers, stabilizers and fillers. Example polymers include, polyurethane polymers, vinyl halide polymers, polyamides, polyesteramides, polyesters, polycarbonates, polyvinyl butyral, polyalphamethylstyrene, polyvinylidene chloride, alkyl esters of acrylic and methacrylic acids, chlorosulfonated polyethylene, copolymers of butadiene and acrylonitrile, cellulose esters and ethers, polystyrene and combinations thereof.

A preferred polymeric material to form the cellular polymeric layer 3 is a polyurethane elastomer made by reacting an organic diisocyanate with an active hydrogen containing polymeric material, for example, a polyalkyleneether glycol or a hydroxyl-terminated polyester to produce an isocyanate terminated polyurethane prepolymer. The resulting prepolymer may be reacted with a chain-extending compound, for example, water or a compound having two active hydrogen atoms bonded to amino-nitrogen atoms. Useful polyurethane elastomers can also be made by replacing all or part of the polymeric glycol with a simple nonpolymeric glycol (e.g., ethylene glycol or propylene glycol). Hydrazine and N-methyl-bis-aminopropylamine are preferred amino nitrogen containing chain extenders. However, other chain extenders include, dimethyl-piperazine, 4 methyl-m-phenylene-diamine, m-phenylene-diamine, 1,4 diaminopiperazine, ethylene diamine and mixtures thereof.

In addition, aromatic, aliphatic and cycloaliphatic diisocyanates or mixtures thereof can be used in forming the prepolymer. For example, tolylene-2,4-diisocyanate, tolylene-2, 6-diisocyanate, m-phenylene diisocyanate, biphenylene 4,4'-diisocyanate, methylene bis(4 phenyl isocyanate), 4-chloro-1,3-phenylene diisocyanate, naphthalene-1,5-diisocyanate, tetramethylene-1,4-diisocyanate, hexamethylene-1,6-diisocyanate, decamethylene-1,10-diisocyanate, cyclohexylene-1,4-diisacyanate, methylene bis(4-cyclohexyl isocyanate) and tetrahydronaphthalene diisocyanate. Arylene diisocyanates, wherein the isocyanate groups are attached to an aromatic ring are preferred.

Preferred polyglycols include, for example, polyethyleneether glycol polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. A polyalkyleneether glycol is the preferred active hydrogen containing polymeric material for the prepolymer formation.

Materials for the conductive substrate 5 include, for example, one or more of a metal (aluminum, copper, tungsten, silver, gold, etc.), metal alloys, graphite, carbon, and conductive polymers. Preferred materials for substrate 5 include copper, copper-based alloys, carbon, and noble metals, such as, rhodium, platinum, silver, gold and alloys thereof. Advantageously, conductive substrate 5 has a conductivity of at least $10^5$ ohm$^{-1}$ cm$^{-1}$. Preferably, conductive substrate 5 has a conductivity of at least $5 \times 10^5$ ohm$^{-1}$ cm$^{-1}$.

Figure 2:
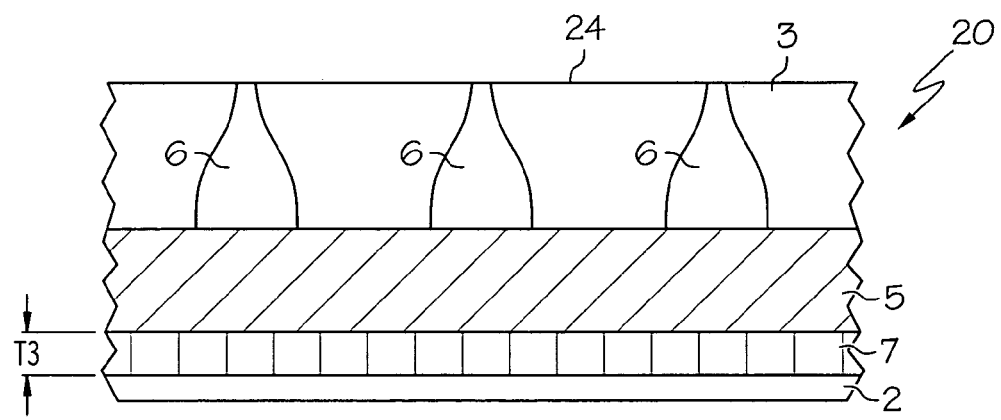
FIG. 2 illustrates another exemplary embodiment of the polishing pad of the present invention.

Referring now to FIG. 2, another embodiment of the present invention is illustrated wherein a polishing pad 20 is shown having a flexible substrate 7 clad by the conductive substrate 5. Like features are designated by the same numerals as in FIG. 1. As defined herein, "flexible" is a material having a flexural modulus between 1 and 5 GPa. Flexible substrate 7 may be, for example, a polyester film. Other example materials for the flexible substrate 7 comprise polyimide films, polyether ether ketone, polyether imide, polysulfone, polyether sulfone. The flexible substrate 7 may be clad on a single side, as illustrated in FIG. 2, or on both sides of the flexible substrate 7 (not shown). The flexible substrate 7 advantageously provides polishing pad 20 with enhanced electrical tuning capabilities and control. The flexible substrate 7 has a thickness T3 between 0.025 mm-0.5 mm. Preferably, thickness T3 is between 0.075 mm-0.375 mm. More preferably, thickness T3 is between 0.125 mm-0.25 mm.

Figure 3:
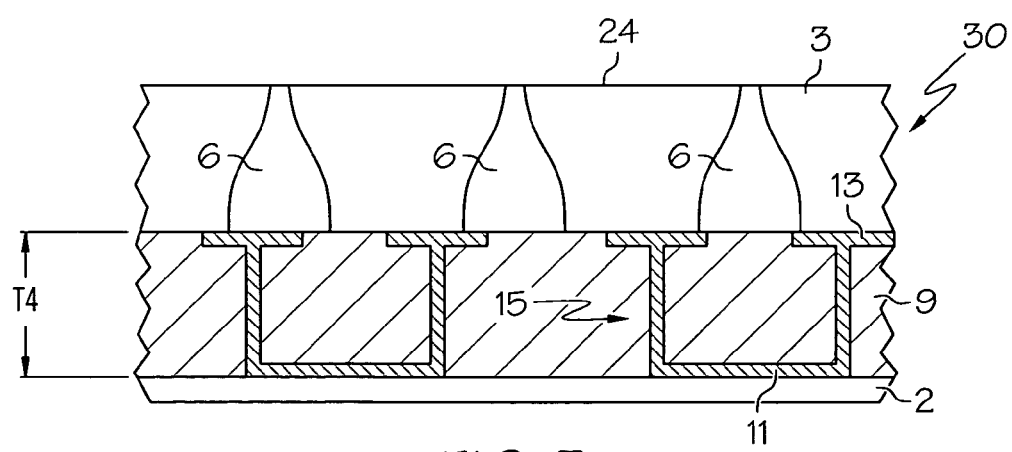
FIG. 3 illustrates yet another exemplary embodiment of the polishing pad of the present invention.

Referring now to FIG. 3, yet another embodiment of the present invention is provided wherein a polishing pad 30 is shown having a circuitized flexible substrate 9. The circuitized flexible substrate 9 advantageously provides polishing pad 30 with enhanced electrical tuning capabilities and control. The material of substrate 9 may be similar to that of the flexible substrate 7 of FIG. 2 above. Circuit 15 comprises an upper circuit 13 and a lower circuit 11. Circuit 15 may be formed of, for example, one or more of a metal (aluminum, copper, tungsten, silver, gold, etc.), metal alloys, graphite, carbon, and conductive polymers. Preferred materials for circuit 15 include copper, copper-based alloys, carbon, and noble metals, such as, rhodium, platinum, silver, gold and alloys thereof.

Upper and lower circuits 13, 11 provide electrical conductivity through the thickness T4 of the substrate 9. In this way, circuit 15 serves as an electrode (cathode) capable of electrically communicating with conductive matter (e.g., carrier substrate (anode)). Circuit 15 allows for good electrical and thermal conductivity to facilitate the ECMP process. In addition, circuitized flexible substrate 9 has a thickness between 0.025 mm-0.5 mm. Preferably, substrate 9 has a thickness between 0.125 mm-0.25 mm.

Accordingly, the present invention provides a polishing pad for electrochemical mechanical polishing, the pad comprising a cellular polymeric layer overlying a conductive substrate. In the present invention, the conductive substrate may serve as an electrode (cathode) capable of electrically communicating with conductive matter. The conductive substrate of the present invention allows for good electrical and thermal conductivity to facilitate the ECMP process, with reduced heat buildup. In addition, the cellular polymeric layer has a thickness T1 to promote ECMP. Thickness T1 is selected to maximize removal during the ECMP process, while maintaining a sufficient thickness to provide optimized planarization. In other words, thickness T1 is optimized so that the cathode and the anode can provide maximum potential for facilitating removal of unwanted materials, while providing sufficient thickness for planarization.

Figure 4:
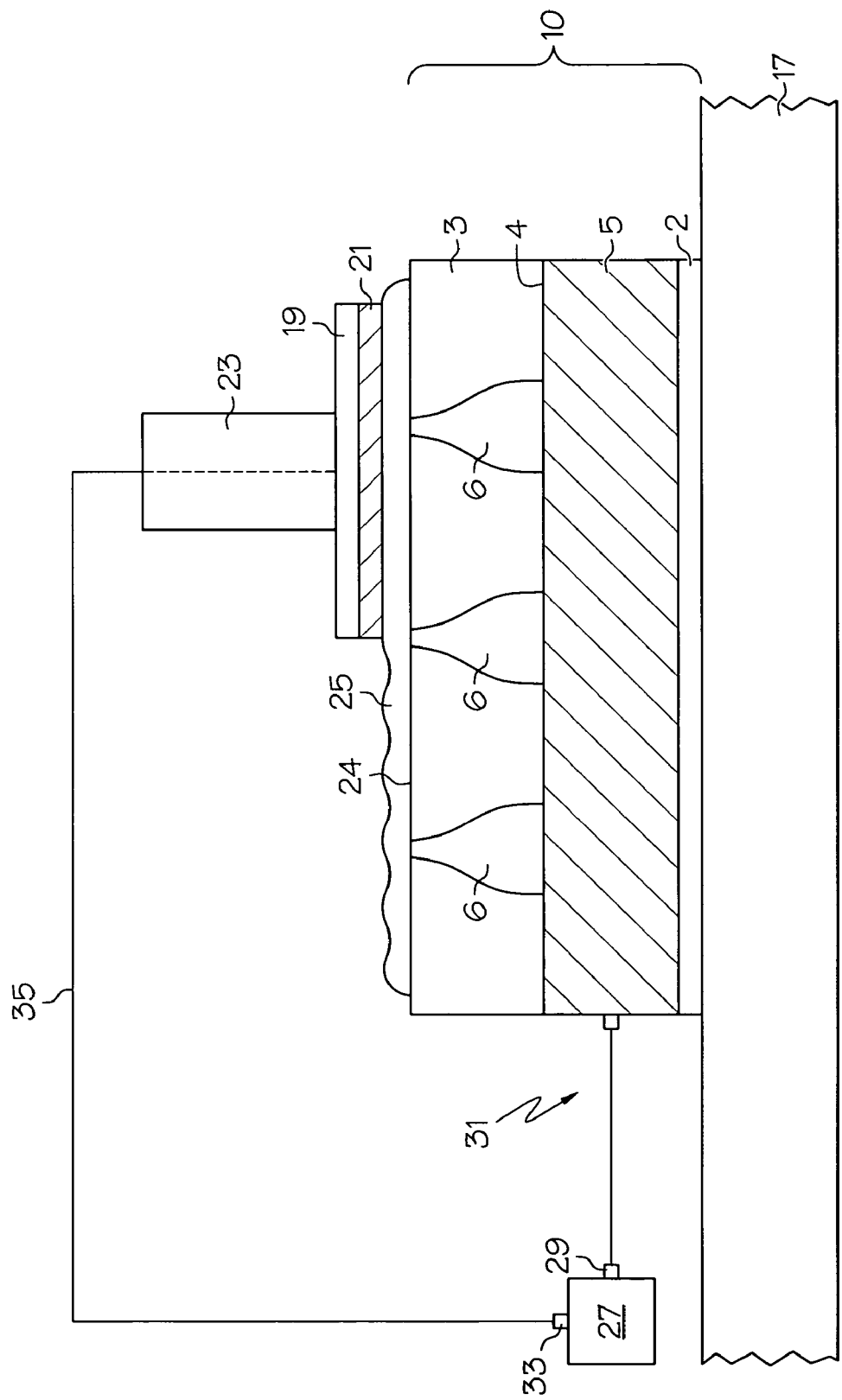
FIG. 4 illustrates an ECMP system utilizing the polishing pad of the present invention.

Referring now to FIG. 4, a cross-sectional diagram of the polishing pad of the present invention is provided, shown as part of an ECMP system. In this embodiment, polishing pad 10 is shown. Pad 10 has a polishing surface 24. Polishing pad 10 is supported by a platen 17. A substrate (e.g., a wafer) 19 having a metal layer 21 (e.g., copper) is held in a substrate carrier 23 and positioned in contact with or in very close proximity to the polishing surface 24 of polishing pad 10. An electrolytic polishing fluid 25 is disposed between polishing surface 24 and substrate metal layer 21.

Conductive substrate 5 (cathode) is connected to a current source 27 at a negative terminal 29 via an electrical connector system 31. Substrate carrier 23 is connected to current source 27 at a positive terminal 33 via a line 35, effectively making substrate 19 (or more particularly, metal layer 21) serve as an anode. Hence, an electrical connection (circuit) is established between the anode and the cathode (conductive substrate 5) through electrically conducting polishing fluid 25.

In certain types of ECMP systems (rotary polishing systems, orbital polishing systems, linear belt polishing systems and web-based polishing systems), the polishing pad is rotated relative to the current source. Thus, with continuing reference to FIG. 4, the ECMP system illustrated therein includes the aforementioned electrical connector system 31, which is adapted to maintain electrical contact between the conductive substrate 5 and current source 27 even when the polishing pad 10 is moved relative to the current source 27. Electrical connector system 31 is adapted to accommodate the different pad motions associated with the different types of polishing systems. For example, in rotary polishers such as IPEC 472, AMAT Mirra, Speedfam Auriga, Strasburg 6DS, a side-mounted connection, a through-platen connection or an endpoint cable setup may be utilized.

What is claimed is:

1. A polishing pad for electrochemical mechanical polishing, the pad comprising:
a cellular polymeric layer overlying a conductive substrate, the cellular polymeric layer having a thickness less than 1.5 mm;
wherein the cellular polymeric layer comprises a plurality of pores that extend through the thickness of the cellular polymeric layer from a polishing surface of the cellular polymeric layer to the conductive substrate; and wherein the plurality of pores exhibit a diameter that is smaller at the polishing surface than at the conductive substrate.

2. The polishing pad of claim 1, wherein the cellular polymeric layer has a thickness less than 0.5 mm.

3. The polishing pad of claim 2, wherein the cellular polymeric layer has a thickness less than 0.25 mm.

4. The polishing pad of claim 1, wherein the conductive substrate has a thickness between 0.07 mm to 0.38 mm.

5. The polishing pad of claim 1, wherein the cellular polymeric layer comprises polyurethane polymers, vinyl halide polymers, polyamides, polyesteramides, polyesters, polycarbonates, polyvinyl butyral, polyalphamethylstyrene, polyvinylidene chloride, alkyl esters of acrylic and methacrylic acids, chlorosulfonated polyethylene, copolymers of butadiene and acrylonitrile, cellulose esters and ethers, polystyrene and combinations thereof.

6. The polishing pad of claim 1, wherein the conductive substrate comprises a material selected from copper, copper-based alloys, carbon, rhodium, platinum, silver, gold and alloys thereof.

7. The polishing pad of claim 1, wherein the conductive substrate has a conductivity of greater than $10^5$ ohm$^{-1}$ cm$^{-1}$.

8. The polishing pad of claim 1, wherein the pad has a pore count at the polishing surface of between 100 and 325 pores per mm$^2$.

9. The polishing pad of claim 1, wherein the pad has a pore count at the polishing surface of between 500 to 10,000 pores per mm$^2$.

10. A polishing pad for electrochemical mechanical polishing, the pad comprising:
a cellular polymeric layer having a thickness less than 1.5 mm and overlying a conductive substrate, wherein the conductive substrate clads a flexible substrate, wherein the cellular polymeric layer comprises a plurality of pores that extend through the thickness of the cellular polymeric layer from a polishing surface of the cellular polymeric layer to the conductive substrate; and wherein the plurality of pores exhibit a diameter that is smaller at the polishing surface than at the conductive substrate.

* * * * *

UNITED STATES PATENT AND TRADEMARK OFFICE
CERTIFICATE OF CORRECTION

| | |
|---|---|
| PATENT NO. | : 7,618,529 B2 |
| APPLICATION NO. | : 10/854321 |
| DATED | : November 17, 2009 |
| INVENTOR(S) | : Ameen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1181 days.

Signed and Sealed this

Twenty-sixth Day of October, 2010

David J. Kappos
*Director of the United States Patent and Trademark Office*